April 29, 1952 A. BOSCH ET AL 2,594,619
MACHINE FOR PIERCING EGGS AND FOR EMPTYING
SAME BY MEANS OF A CURRENT OF AIR
Filed Oct. 14, 1949 3 Sheets-Sheet 1
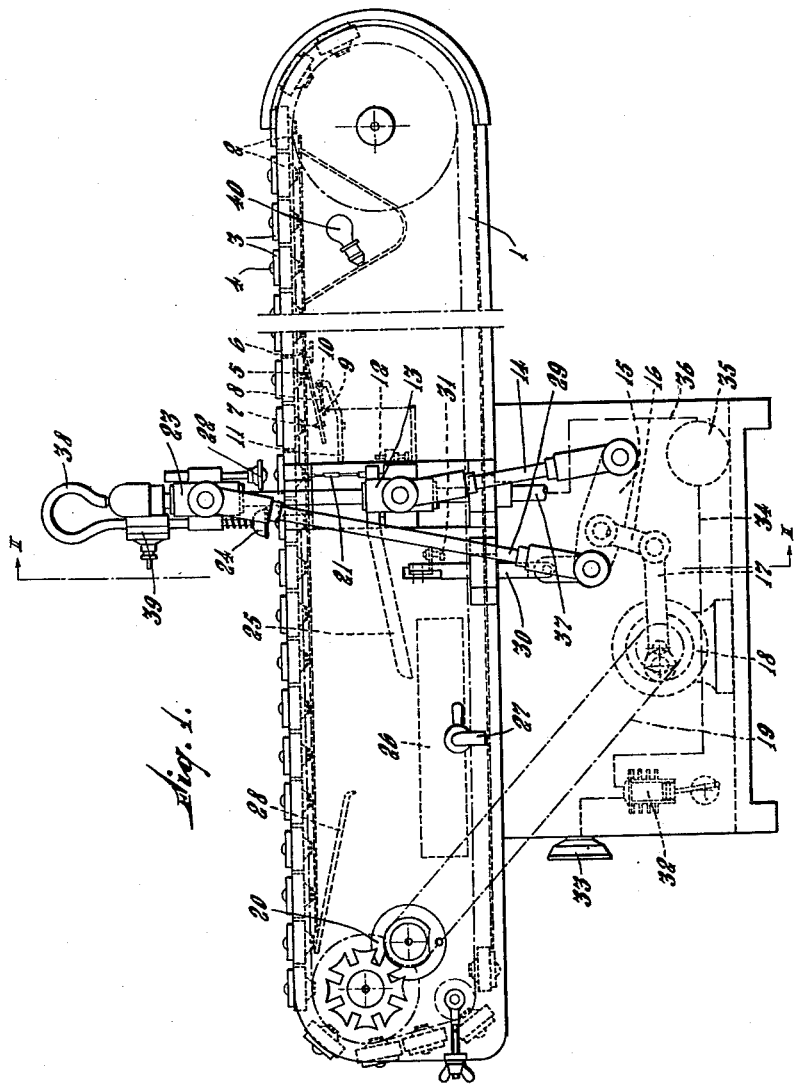
INVENTORS
ALEXANDER BOSCH
GERRIT JAN NOLTES
BY
ATTORNEYS

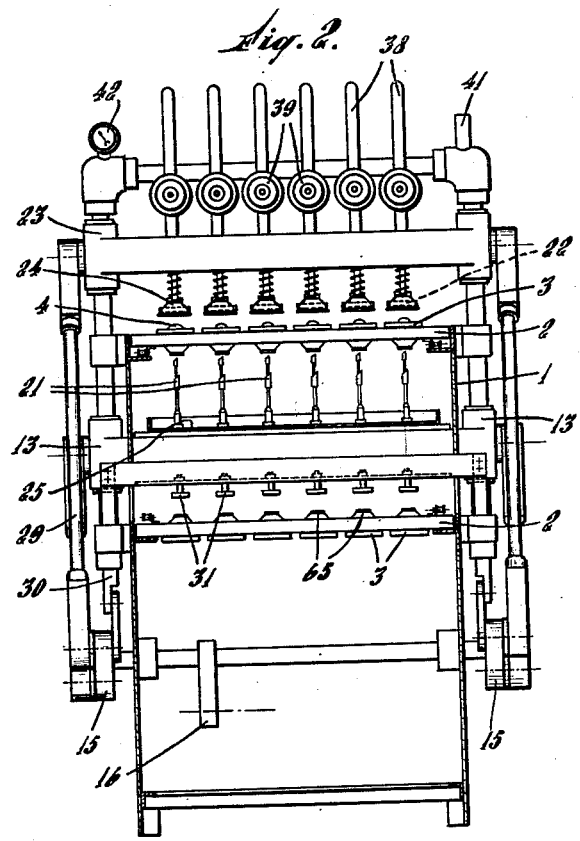
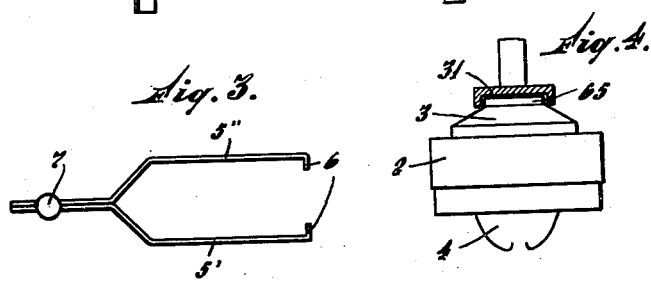

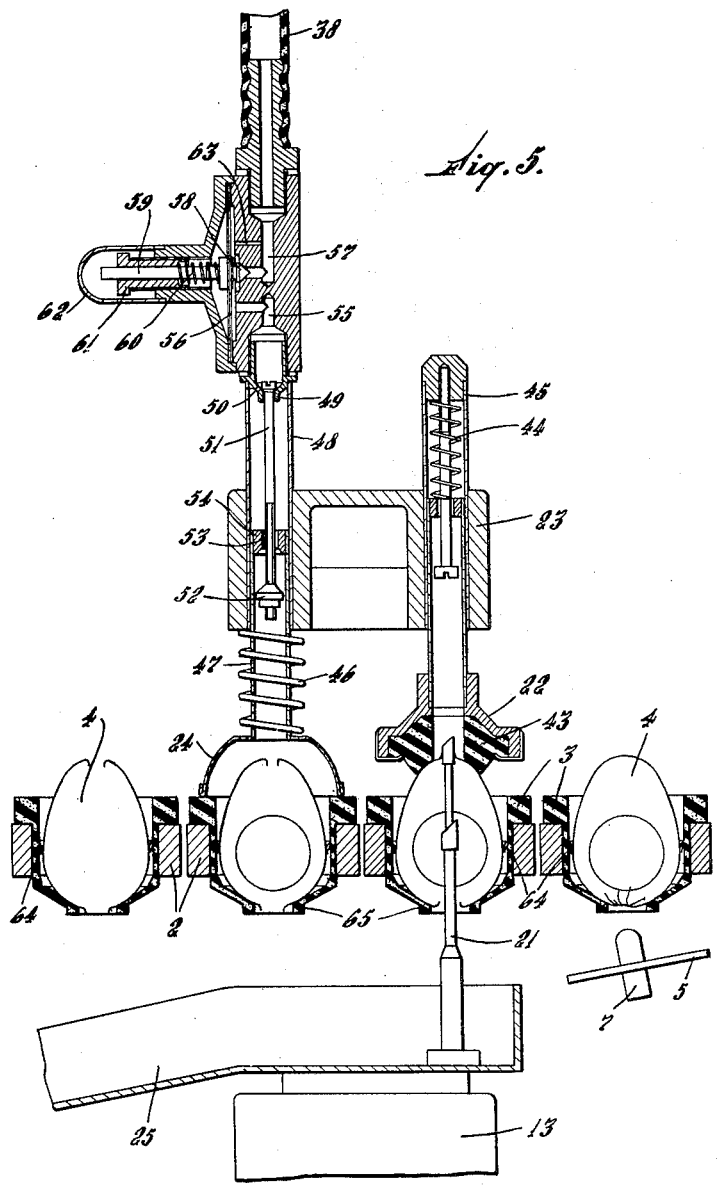

Patented Apr. 29, 1952

2,594,619

UNITED STATES PATENT OFFICE 2,594,619

MACHINE FOR PIERCING EGGS AND FOR EMPTYING SAME BY MEANS OF A CURRENT OF AIR

Alexander Bosch and Gerrit Jan Noltes, Amsterdam, Netherlands

Application October 14, 1949, Serial No. 121,376
In the Netherlands October 19, 1948

6 Claims. (Cl. 146—2)

This invention relates to a machine for piercing eggs and for emptying same by means of a current of air, which machine comprises a carrier for the eggs and piercing pins, said carrier and pins being intermittently displaceable relative to one another in such a manner that each time one or a plurality of eggs will lie opposite one or a plurality of piercing pins, while when the carrier and the piercing pin(s) are at a standstill relative to one another, said piercing pin(s) will become operative in a direction normal to the direction of said relative movement.

This invention provides an improvement upon this known machine which improvement is characterized in that the piercing pins are solely arranged underneath the carrier and not above it.

This characteristic has in itself important advantages and opens up new avenues to advantageous structural features.

A drawback of pins inserted from above, namely, is that the contents of the egg that are displaced by the pins can initially escape in upward direction only so that it will drip down along the egg. This is unhygienic and results in losses. In the machine according to this invention all of the egg's contents can directly escape at the lower side and be caught.

Especially in the case of ducks' eggs, the contents of which are harder to remove, it is of advantage for the piercing pins to be so shaped that they will prick a larger hole in the bottom portion than in the top portion of the egg shells, so as to facilitate said removal.

If the piercing pins are provided with thickened portions below which there is a portion of smaller cross-sectional area, the edges of the pierced shell will be pulled downwardly when the piercing pin is retracted, which likewise facilitates the emptying of the eggs.

In order to prevent the eggs from being lifted during the piercing operation, it is recommendable for stop means to be provided above the carrier for the eggs.

For blowing the eggs caps isolating the eggs from the atmosphere may be provided which as seen looking in the relative direction of movement of the carrier, are located behind the point where the piercing pins are situated, which caps are movable in vertical direction and which are connected to an air conduit.

The operation of the machine is as much as possible automatic. In connection herewith it is suitable for the conduit to the air caps to be so constructed that when the caps are moved towards the eggs, an air valve in the conduit is automatically opened.

If, however, an egg should erroneously not have been put in its place on the carrier, the air would in substance flow through the opening thus left free so that the pressure or the suction of the air for the other simultaneously treated eggs would become too slight.

In order to avoid this it is preferable for the air conduit to comprise a valve of such a construction that it will automatically close as soon as the resistance to flow with which the air under the caps meets, drops to below a given value.

In a suitable embodiment this valve is provided with a diaphragm arranged in a casing which at one side of the diaphragm continuously communicates with the air conduit through a narrow channel, while a second wider connecting channel provided in the casing on the same side of the diaphragm, is obturated by said diaphragm or by a member secured thereto, said diaphragm or the closure member secured thereto being influenced by a closing spring which, if desired, may be adjustable.

Eggs having a hard shell might be pushed upwardly by the piercing pins. In order to check this it would be necessary to increase the counter pressure of the stop means to a value which would be too great for weak eggs.

Small mallets had better be provided, therefore, which will crack the egg shells prior to the piercing operation so that the piercing pins will meet with less resistance, and which—as seen looking in the relative direction of movement of the carrier—should be disposed before the point where the piercing pins are located.

Thus the resistance to piercing is brought for all eggs to (about) the same value. If the small mallets should be directly driven, for example by coupling them to a rotating shaft, the eggs that protrude farther downwardly, would have to take up too large a quantity of motion so that they would be crushed.

In order to prevent this the mallets may be so mounted as to be freely swingable and may be operated by actuating means coupled with a driving mechanism. In that case each mallet cannot exert more force on an egg than corresponds with its own quantity of motion. In order to make the mallets hit the eggs with a well-directed stroke, it is recommendable for said mallets to have their pivots located approximately level with the lower side of the eggs and to have their shafts forked in such a manner that the eggs can pass between the prongs of the fork.

The heads of the mallets are preferably so fitted to the shafts as to be adjustable.

The invention is illustrated in greater detail hereinafter with reference to the accompanying drawing.

In this drawing:

Fig. 1 shows a side view of the new machine,

Fig. 2 shows a cross-section thereof on the line II—II in Fig. 1,

Fig. 3 shows a plan view of the small mallets with shafts,

Fig. 4 is a showing on a larger scale of an egg cup having an ejector superimposed thereon, said ejector being shown in section, and Fig. 5 likewise on a larger scale shows a longitudinal section through an upper portion of the conveyor belt with piercing pin, stop means and a portion of the blowing device.

The reference numeral 1 indicates the machine which comprises an endless conveyor belt consisting of interconnected carriers 2 in which rubber cups 3 are mounted in rows of six, said cups serving for holding the eggs 4.

Below the upper part of the belt small mallets are disposed each of which mallets comprises a bifurcated shaft 5 pivoted at 6 and the hammer head 7 proper, said head being adjustable in the longitudinal direction of the shaft. The mallets are pivoted independently of one another, their pivots being approximately level with the lower side of the eggs, which eggs can pass between the prongs 5' and 5" (see Fig. 3) of the bifurcated shaft. The mallets are actuated by operating arms 8, all of which arms are mounted on a shaft 10 which is periodically rotated by the lever 9, the end 11 of which is lifted by an adjustable ram pin 12 secured to the sliding head 13 of the machine.

Said sliding head is moved up and down by connecting rods 14 actuated by a rocking lever 15 (also see Fig. 2) which in turn is actuated by an arm 16 and a connecting rod 17, the latter being reciprocated by a crank of a retarding gear driven by the electromotor 18. Said retarding gear drives the Geneva movement 20 via a non-slipping drive 19, which Geneva movement imparts a step-wise movement to the conveyor belt.

To the sliding head 13 are secured the piercing pins 21 (also see Fig. 5), which comprises two thickened portions having bevel cutting edges. The upper thickened portion is of smaller cross-section than the lower, which facilitates the subsequent emptying of the egg. Above the belt the stop means 22 are located, which are secured to a sliding head 23 which also carries the air caps 24.

To the sliding head 13 a collecting tray 25 is secured which leads the contents of the eggs to a reservoir 26 having a draining cock 27. The numeral 28 indicates a wiping means which also discharges into the reservoir 26.

The sliding head 23 is driven in opposition to the head 13 by connecting rods 29 which are also actuated by the rocking lever 15 as are the connecting rods 30 of the ejectors 31.

The compressed air required is supplied by a compressor 32 drawing in air through a filter 33. Via a conduit 34, a pressure equalizer or a compressed air accumulator 35 and a conduit 36 the compressed air is supplied to the hollow rods 37 which at the same time serve as a guide for the sliding heads 13 and 23.

At their upper side the rods 37 are connected with a diaphragm casing 39 by means of rubber tubes 38 (also see Fig. 5).

Beneath the foremost portion of the upper part of the conveyor belt transilluminating devices 40 are located. A safety valve 41 and a manometer 42 are connected to the rods 37.

The stop means (see Fig. 5) are provided with a rubber cushion 43 and they are vertically movable in opposition to a spring 44 arranged in a tube 45, which spring determines the pressure with which said stop means bear on the eggs.

The air caps 24 are influenced by a compression spring 46 arranged about the tube 47. The tube 48, which is adapted to telescope over the tube 47, internally comprises a supporting element 49 having apertures 50 provided therein. Said supporting element supports a valve stem 51 with valve 52, which stem passes through a wider opening 53 in the valve seat 54. When the air caps 24 rest on the cups 3, the opening 53 will be open and the compressed air can flow into the air caps.

The air is supplied through the channel 55 in the diaphragm casing, which channel communicates with the space at the right hand side of the diaphragm 56. The air will enter this space when the valve 58 with stem 59 has been pressed open in opposition to the spring 60 by the air pressure prevailing in the space in question, said space communicating with the channel 57 via the narrow channel 63. The pressure of the spring 60 may be adjusted by the nut 61 enclosed by the cap 62.

The egg cups 3 are internally provided with a flexible rim 64 which prevents air from leaking past the egg. At the lower side, the cups 3 have a collar 65 about which (see Fig. 4) the cup-shaped ejectors 31 are located, which ejectors push in the bottom of the cups and thus eject the egg shells.

Prior to the piercing operation the small mallets (see Fig. 3) will dent the egg shell. Thereupon the shells are pierced. Owing to the retraction of the piercing pins the portions of the shells that have first been pushed upwards are now pulled downwards, which facilitates the emptying of the eggs.

After the conveyor belt being moved on one step, the air caps are placed over the eggs and the eggs are blown.

When the eggs have been emptied (or if there is no egg in one of the cups) a larger quantity of air will escape through the caps 24. Owing to the throttling occuring in the channel 63, the air pressure acting on the diaphragm will be reduced and the valve 58 will be closed under the influence of the spring 60.

The new machine has a large capacity and is very safe in operation.

We claim:

1. A machine for piercing eggs and for emptying same by means of a blast of compressed air, comprising a carrier for the eggs and piercing pins, means for intermittently moving said carrier and pins relative to one another so that each time one or a plurality of eggs will lie opposite a plurality of piercing pins, means for operating said pins when the carrier and the piercing pins are at a standstill relative to one another in a direction normal to the direction of said relative movement, said piercing pins having spaced thickened portions of different cross-sectional size thereon below each of which there is a portion of smaller cross-sectional area, the smaller of said thickened portions being closer to the free end of said pin than the other to prick a larger hole in the bottom portion than in the top portion of the egg shells, and said piercing pins being solely arranged underneath said carrier.

2. A machine according to claim 1 and including stop means above the carrier for coaction with the egg for preventing upward movement thereof during piercing.

3. A machine according to claim 1, and caps for isolating the eggs from the atmosphere above the carrier, said caps being vertically movable toward and away from the eggs, and an air conduit connected into said caps.

4. A machine according to claim 3, and an air valve in said conduit to the air caps, means biasing said air valve to closed position when resistance to flow of the air under the cap falls below a predetermined value and means for automatically opening said air valve when said caps are moved towards the eggs.

5. A machine according to claim 4, wherein said valve comprises a diaphragm arranged in a casing which at one side of the diaphragm continuously communicates with the air conduit through a narrow channel, a second wider connecting channel provided in the casing on the same side of the diaphragm and closable by said diaphragm, and a spring operatively connected with said diaphragm for activating said diaphragm to closing position.

6. A machine according to claim 1 and including pivotally mounted small mallets located adjacent said piercing pins, said mallets being swingable into contact with the eggs, actuating means for said mallets and a driving mechanism for said actuating means.

ALEXANDER BOSCH.
GERRIT JAN NOLTES.

REFERENCES CITED

The following references are of record in the file of this patent:

UNITED STATES PATENTS

| Number | Name | Date |
|---|---|---|
| 1,945,860 | Laffler | Feb. 6, 1934 |
| 2,172,419 | Thomas | Sept. 12, 1939 |
| 2,224,941 | Weimer | Dec. 17, 1940 |
| 2,269,254 | Cribb | Jan. 6, 1942 |
| 2,445,490 | Meade | July 20, 1948 |
| 2,446,812 | Cribb et al. | Aug. 10, 1948 |
| 2,575,584 | Cohen | Nov. 20, 1951 |

FOREIGN PATENTS

| Number | Country | Date |
|---|---|---|
| 73,706 | Germany | May 9, 1893 |
| 104,515 | Switzerland | Apr. 16, 1924 |
| 1,799 of 1931 | Australia | Apr. 27, 1931 |
| 214,873 | Switzerland | Aug. 16, 1941 |